Aug. 20, 1929.  E. R. HERZOG  1,725,352
CROSS MEMBER FOR TIRE CHAINS
Filed Nov. 18, 1926
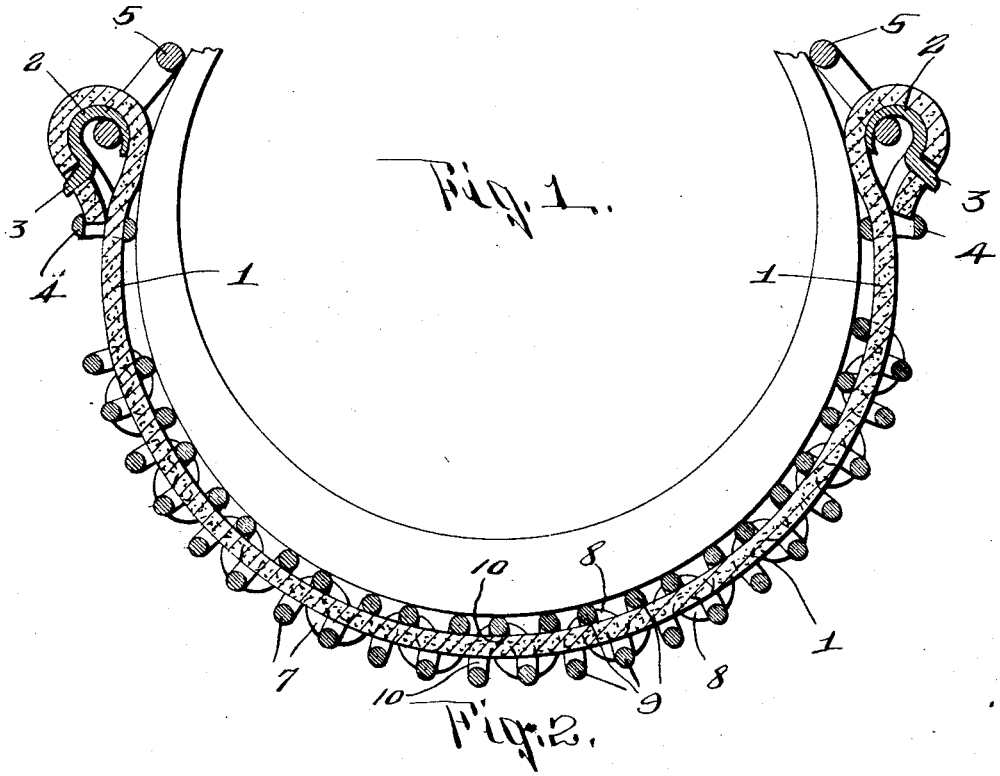
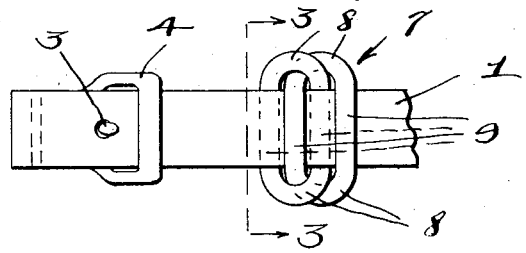
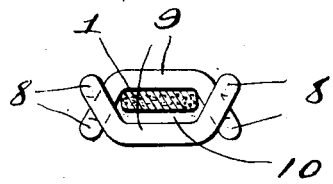
INVENTOR.
Edgar R. Herzog.
BY Parsons & Bodell
ATTORNEYS.

Patented Aug. 20, 1929.

1,725,352

UNITED STATES PATENT OFFICE.

EDGAR R. HERZOG, OF SYRACUSE, NEW YORK.

CROSS MEMBER FOR TIRE CHAINS.

Application filed November 18, 1926. Serial No. 149,241.

This invention has for its object a particularly simple and efficient cross member for non-skid devices for motor vehicle wheels that is for so-called tire chains, by which the tread members are carried by the centrifugal force toward the center of the cross member when the tread members at the center become worn out and fall off. The cross member further has for its object a particularly simple and economical construction of the tread members.

The invention consists in the novel features and in the combinations and constructions hereinafter described and claimed.

In describing this invention reference is had to the accompanying drawings in which like characters represent corresponding parts in all the views.

Figure 1 is a lengthwise sectional view of a cross member embodying my invention, the contiguous portion of a tire being also indicated.

Figure 2 is a fragmentary plan view of the cross member.

Figure 3 is a sectional view on line 3—3, Figure 2.

This cross member comprises generally a supporting strap and a plurality of tread members formed with passages through which the strap extends so that the tread members are threaded on the strap and are free to be carried toward the center of the strap by the centrifugal force when the cross member is in use.

1 designates a strap, which is preferably in the form of a flat strap of yielding or comparatively soft material as leather, the strap being looped at its ends around a clip or seat 2 having a buckle consisting of a tongue 3 for extending through a hole in the end of a strap and also having a link 4 through which the end of the strap is inserted after the tongue 3 is inserted in the hole in the strap. This seat 2 and buckle is an old article used in harness making. The looped end portions of the strap pass through the links 5 of the side chains of the non-skid device or tire chain.

7 are the tread members. The tread members are preferably independent of each other, and each consists of two elongated links or rings, each having its end portions 8 deflected out of the plane of the intermediate portion 9, the rings constitute each tread member and are arranged oppositely to each other with one side portion 9 of one link extending between and nested in the side portions of its companion ring so that the two links of each pair form opposite sides of a passage 10 through which the strap 1 passes.

This construction of tread member is particularly economical as the parts are duplicates and can also be readily assembled. In use these tread members slide toward the center of the strap as those in the center wear out and drop off. Also owing to the yielding strap 1 and the arrangement of the tread members the life of the cross member is materially greater than that of other forms of cross chains hereto used where metal parts cut against each other.

What I claim is:—

1. A cross member for non-skid devices for vehicle wheels comprising a flat supporting strip and a plurality of tread members formed with passages through which the strip is passed so that said members are loosely threaded on the strap, the tread members being independent of each other and arranged to slide along the strip to the center thereof under the influence of the centrifugal force when any of said members are displaced, each member comprising a pair of parts and each part being in the form of a ring with its end portions deflected out of the plane of the intermediate portion and the parts of each member being arranged oppositely to each other with one side thereof extending between sides of the other part whereby the two parts form a passage for the strap.

2. A cross member for non-skid devices for vehicle wheels comprising a supporting strap and tread members on the strap, the tread members consisting of parts in the form of an elongated ring having its end portions deflected out of the plane of the intermediate portion of the ring, each part having one side extending between the sides and the next part and nested therein to form a passage through which the strap extends.

3. A cross member for non-skid devices for vehicle wheels comprising a supporting element and tread members threaded on said element, the tread members consisting of parts each of which is in the form of a ring having opposite portions deflected out of the plane of the intermediate portion of the ring, each part having one side extending between sides of the next part and nested therein to form a passage through which the supporting element extends.

In testimony whereof, I have hereunto signed my name at Syracuse, in the county of Onondaga, and State of New York, this 9th day of November, 1926.

EDGAR R. HERZOG.